No. 624,194. Patented May 2, 1899.
E. P. DOTY.
CREAM SEPARATOR.
(Application filed Nov. 12, 1898.)

(No Model.)

WITNESSES:
C. G. Schoeneck
M. A. Franklin

INVENTOR
E. P. Doty
BY
Smith & Denison
ATTORNEYS.

UNITED STATES PATENT OFFICE.

ELLSWORTH P. DOTY, OF CATO, NEW YORK.

CREAM-SEPARATOR.

SPECIFICATION forming part of Letters Patent No. 624,194, dated May 2, 1899.

Application filed November 12, 1898. Serial No. 696,245. (No model.)

*To all whom it may concern:*

Be it known that I, ELLSWORTH P. DOTY, of Cato, in the county of Cayuga, in the State of New York, have invented new and useful Improvements in Cream-Separators, of which the following, taken in connection with the accompanying drawings, is a full, clear, and exact description.

My invention relates to cream-separators, and particularly to that class in which the milk is strained, sprayed, and aerated all at the same time, and can also be mixed with water to facilitate the raising of the cream.

My object is to produce an improved separator adapted to perform all of these several functions in which the strainer and spraying device is mounted in or upon or is a part of a reversible cover which in either position closes the top of the can and in which the body of the can is contracted to form a surface against which the milk strikes and from which the streams of milk strike to be broken up, more or less, into drops as an aid to the aeration. When water is used to aid in the separation, it is put into the can, and then the milk is strained and sprayed and falls into it. The can is also provided with a series of vent-holes to permit hot air and the animal odor to pass off freely. It is constructed as follows, reference being had to the accompanying drawings, in which—

Figure 1:
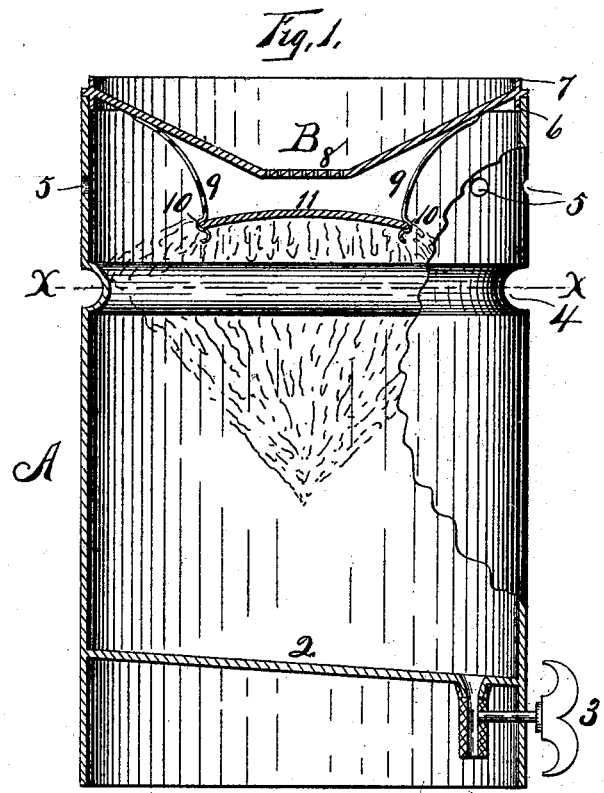
Figure 2:
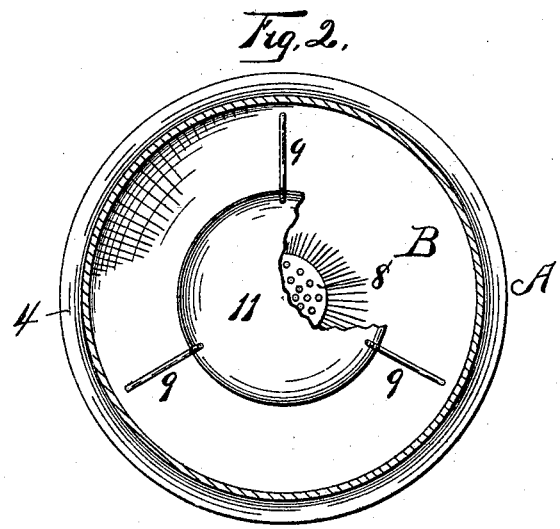

Figure 1 is a vertical section of the can, showing the cover in position for straining and spraying the milk. Fig. 2 is a cross-section thereof on line *x x*, looking upward.

A is the can, having a bottom 2, a suitable draw-off faucet 3, a contraction or neck 4, bulging inwardly, or otherwise inwardly-projecting vent-holes 5, which can be open or covered with a strainer of cloth or other suitable material to exclude insects.

B is the cover, concavo-convex and provided with suitable flanges 6 7, projecting above and below the edge, the one being a rim around the concavity, and each adapted to enter or fit over the top of the can and close it. A suitable strainer 8 is suitably mounted in the cover.

Spring-fingers 9 are secured to the convex side of the cover, having their free ends 10 bent so as to receive or form a support for a concavo-convex disk or sprayer 11, removably inserted thereinto or thereon with the convex side uppermost.

Fig. 1 shows the cover in position ready for use for straining and spraying.

The milk poured into the concave top or hopper is strained, falls onto the sprayer, flows over its surface, is discharged from its edges in streams, more or less of which fly against the convexity or neck-wall of the can and are thereby broken up into drops, which are deflected toward the center of the can or flow down over its inner walls and are thereby thoroughly aerated, the heated or displaced air flowing out through the vents, carrying with it the animal odor of the milk.

If water is used to dilute the milk and expand the cream-globules to facilitate or quicken the raising of the cream, a sufficient quantity is first placed in the can and the milk falls into it.

Having described my invention, what I claim, and desire to secure by Letters Patent, is—

In a cream-separator, the combination with a can having a constricted neck of a reversible concavo-convex cover having upward and downward flanges adjacent to its edge and in alinement with each other, a strainer at the center of said cover, spring-fingers separately secured to the convex side of said cover on converging lines and diverging from it, and a concavo-convex sprayer removably supported by said fingers adjacent to said extremities whereby the milk is thrown from said sprayer against said constricted neck and is thereby broken up.

In witness whereof I have hereunto set my hand this 9th day of November, 1898.

ELLSWORTH P. DOTY.

Witnesses:
 HOWARD P. DENISON,
 M. A. FRANKLIN.